United States Patent
Agnes Desodt et al.

(10) Patent No.: US 9,246,532 B2
(45) Date of Patent: Jan. 26, 2016

(54) PROTECTIVE COVER SYSTEM WITH VIEWING PORT FOR MOBILE COMPUTING DEVICE

(71) Applicant: OTTER PRODUCTS, LLC, Fort Collins, CO (US)

(72) Inventors: Hortense Caroline Agnes Desodt, San Francisco, CA (US); Vivian Kate Barad, San Francisco, CA (US); Daniel Stefan Soltzberg, Felton, CA (US)

(73) Assignee: OTTER PRODUCTS, LLC, Fort Collins, CO (US)

( * ) Notice: Subject to any disclaimer, the term of this patent is extended or adjusted under 35 U.S.C. 154(b) by 0 days.

(21) Appl. No.: 14/316,029

(22) Filed: Jun. 26, 2014

(65) Prior Publication Data
US 2015/0005034 A1 Jan. 1, 2015

Related U.S. Application Data

(60) Provisional application No. 61/840,289, filed on Jun. 27, 2013.

(51) Int. Cl.
| | |
|---|---|
| *H04M 1/00* | (2006.01) |
| *H04B 1/38* | (2015.01) |
| *H04B 1/3888* | (2015.01) |
| *A45C 11/00* | (2006.01) |

(52) U.S. Cl.
CPC .............. *H04B 1/3888* (2013.01); *A45C 11/00* (2013.01); *A45C 2011/002* (2013.01); *A45C 2011/003* (2013.01); *G06F 2200/1633* (2013.01)

(58) Field of Classification Search
CPC .................. H04B 1/3888; A45C 11/00; A45C 2011/002; A45C 2011/003; H04M 1/0202; H04M 1/0266

USPC ................................... 455/90.1, 566
See application file for complete search history.

(56) References Cited

U.S. PATENT DOCUMENTS

| | | | |
|---|---|---|---|
| 7,464,814 B2 | 12/2008 | Carnevali | |
| 2003/0160884 A1* | 8/2003 | Hanson | H04N 5/23293 348/333.01 |
| 2006/0022954 A1* | 2/2006 | Berry | 345/173 |
| 2010/0045628 A1* | 2/2010 | Gettemy et al. | 345/173 |
| 2012/0308981 A1 | 12/2012 | Libin et al. | |
| 2013/0076614 A1* | 3/2013 | Ive et al. | 345/156 |
| 2013/0162668 A1 | 6/2013 | Lauder et al. | |

OTHER PUBLICATIONS

"Samsung Galaxy S4 S View Cover hands-on" Posted May 10, 2013. Accessed Jul. 14, 2014. http://www.phonearena.com/news/Samsung-Galaxy-S4-S-View-Cover-hands-on_id42821.

* cited by examiner

*Primary Examiner* — Martin Mushambo (57) ABSTRACT

A system for use with a mobile electronic device comprises a protective cover and a set of computer-executable instructions. The protective cover includes a securing element that affixes the protective cover to the mobile electronic device. A cover element is attached to the securing element to protect the mobile electronic device. The cover element has an open position and a closed position with respect to the mobile electronic device. The open position provides access to a display of the mobile electronic device while the closed position provides protection for the display. The cover element includes an aperture through which a portion of the display is viewable when the cover element is in the closed position. The set of instructions is executable by a computer processor of the mobile electronic device to display status information in the portion of the display viewable when the cover element is in the closed position.

19 Claims, 4 Drawing Sheets

PROTECTIVE COVER SYSTEM WITH VIEWING PORT FOR MOBILE COMPUTING DEVICE

CROSS-REFERENCE TO RELATED APPLICATIONS

This application claims priority to U.S. patent application Ser. No. 61/840,289, filed Jun. 27, 2013, which is hereby incorporated by reference in its entirety.

FIELD

The present application relates to a protective cover for an electronic device.

BACKGROUND

Electronic devices and mobile computing devices are commonly used for communication, entertainment, Internet access, as well as other purposes. Examples of electronic and mobile computing devices include cellular phones, smartphones, tablets, audio players, video players, cameras, portable computers, two-way radios, and GPS receivers. As the reliance upon and frequency of use of these types of devices continues to increase, the risk of damage to these devices also increases. Consequently, there is an increasing need to protect these devices from damage such as damage from being dropped, scratched, impacted, subject to shock, exposed to water, exposed to dust, exposed to rain, exposed to snow, and/or exposed to other damaging elements or conditions.

SUMMARY

A system for use with a mobile electronic device or mobile computing device is provided. The system includes a protective cover for the mobile electronic device and a set of non-transitory computer-executable instructions. The protective cover includes a securing element and a cover element. The securing element affixes the protective cover to the mobile electronic device. The cover element is attached to the securing element and configured to protect one or more surfaces of the mobile electronic device. The cover element has an open position and a closed position with respect to the mobile electronic device. The open position provides access to a display of the mobile electronic device while the closed position provides protection for the display. The cover element includes an aperture through which a portion of the display is viewable when the cover element is in the closed position. The set of instructions is downloadable to the mobile electronic device from a computer server over a network. The instructions are executable by at least one computer processor of the mobile electronic device and direct the mobile electronic device to display status information in the portion of the display viewable when the cover element is in the closed position.

In another configuration, a system includes a protective case and a set of non-transitory computer instructions. The protective case is for use with a mobile computing device having a display. The protective case is semi-permanently attachable to the mobile computing device and configured to protect the mobile computing device. The protective case has at least an open position and a closed position with respect to the display of the mobile computing device. The open position provides access to the display. The closed position provides protection for the display. The protective case includes viewing ports through which an area of the display is visible when the protective case is in the closed position. The set of computer instructions is executable by a computer processor of the mobile computing device to direct the mobile computing device to activate the area of the display in response to an event.

BRIEF DESCRIPTION OF THE DRAWINGS

Embodiments of the present invention will be described and explained through the use of the accompanying drawings in which.

DETAILED DESCRIPTION

In the following detailed description, various specific details are set forth in order to provide an understanding of and describe the techniques, systems, and apparatuses introduced herein. However, the techniques may be practiced without the specific details set forth in these examples. Various alternatives, modifications, and/or equivalents will be apparent to those skilled in the art without varying from the spirit of the introduced apparatuses and techniques. For example, while the examples described herein refer to particular features, the scope of this solution also includes systems, techniques, and implementations having different combinations of features and embodiments that do not include all of the described features. Accordingly, the scope of the systems, techniques, and solutions introduced herein are intended to embrace all such alternatives, modifications, and variations as fall within the scope of the claims, together with all equivalents thereof. Therefore, the description should not be taken as limiting the scope of the invention, which is defined by the claims.

Many users wish to protect their electronic devices using covers and/or cases which can protect the electronic devices from shock, impact, breakage, dropping, scratching, water, snow, dust, dirt, and/or other damaging forces or elements. Because display screens are sometimes the most fragile components of electronic devices, many protective covers and cases cover the electronic device's display. Because the display is often covered, it is often difficult for the user to determine if the electronic device is providing any notifications or reminders without opening the protective cover.

Figure 1A:
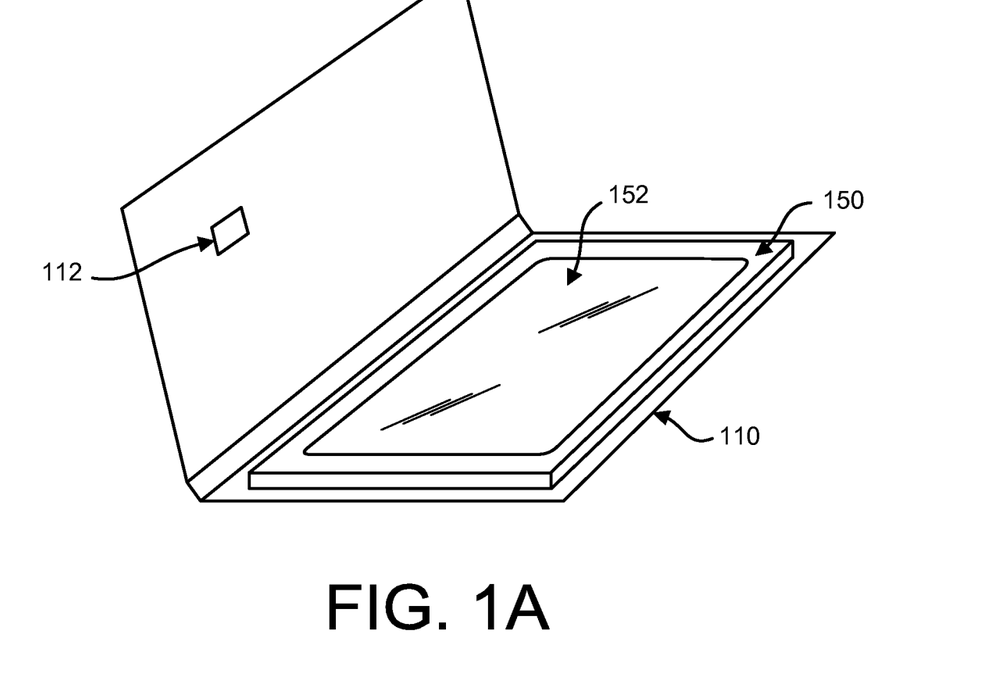
FIG. 1A illustrates an electronic device in a protective cover in an open position.

FIG. 1A illustrates an electronic device 150 in a protective cover 110. Electronic device 150 is illustrated as a tablet computing device but could also be a cellular phone, a smartphone, a notebook computer, a camera, a global positioning system (GPS) receiver, a video player, an audio player, an electronic book reading device, a two-way radio, or a combination thereof. In the example of FIG. 1A, electronic device 150 has a display screen 152 for displaying information to a user of electronic device 150. Display screen 152 may be a single display device. Alternatively, the functions of display screen 512 may be spread across multiple display or indication devices (e.g., a liquid crystal display and one or more discrete indicating elements such as light emitting diodes (LEDs)). In some configurations, display screen 152 may be a touch screen display.

Protective cover 110 provides protection to electronic device 150. Protection may include protection from shock, impact, breakage, dropping, scratching, water, snow, dust, dirt, and/or other damaging forces or elements. Protective cover 110 may protect display screen 152 and may also protect other parts of electronic device 150, including protecting sides, back, and/or other surfaces or components of electronic device 150. In the example of FIG. 1A, protective cover 110 is capable of providing protection to both the front and back of electronic device 150. Specifically, protective cover 110 is semi-permanently attached to electronic device 150 such that it stays in place with respect to the back of electronic device 150 and has a front portion that can be opened and closed with respect to the front of electronic device 150. A front cover portion of protective cover 110 can be opened to gain access to display 152 or closed to provide protection for display 152.

It should be understood that many other protective cover and/or case configurations are possible. In one example, protective cover 110 protects only the front and one or more sides of electronic device 150 when in the closed position. In another example, protective cover 110 protects only the front of electronic device 150. In yet another example, protective cover 110 protects only display 152 of electronic device 150. Protective cover 110 may be secured to electronic device 150 in a number of different ways. A variety of securing elements may be used including one or more fasteners, clips, magnets, straps, elastic components, pockets, snaps, flexible components, other methods of attachment, or combinations thereof.

In other situations, protective cover 110 may include one or more resilient materials which may be deformed or stretched and, when relaxed, capture or otherwise retain electronic device 150. The systems, techniques, and apparatuses introduced here are not be limited to any specific type of protective cover or to a protective cover that attaches to, adheres to, or retains electronic device 150 in any specific way. In some situations, protective cover 110 may be held in an open position, in a closed position, or both, using a zipper, a clasp, a fastener, a snap, a clip, a button, and/or a magnet.

Protective cover 110 may be formed from a variety of materials including plastic, silicone, fabric, cloth, metal, textile, ceramic, metalized ceramic, polymer, elastomer, or a combination thereof.

Figure 1B:
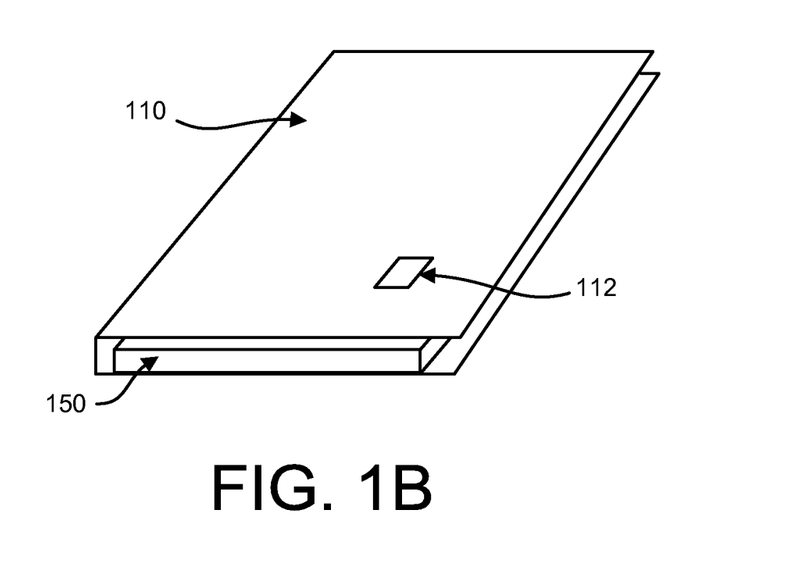
FIG. 1B illustrates an electronic device in a protective cover in a closed position.

In FIG. 1A, protective cover 110 is in an open position. In FIG. 1B, protective cover 110 is closed and provides protection to all or most of display 152. Protective cover 110 includes window 112. Window 112 is a window, port, aperture, or opening in protective cover 110 that allows a portion of display 152 to still be seen by a user of electronic device 150 when protective cover 110 is in the closed position.

Electronic device 150 may include one or more of various types of communication capabilities enabling it to receive communications such as an email message, a text message, an instant message, a chat message, a telephone phone call, a voicemail, a page, a social media notification, a news alert, or another type of communication, including combinations thereof. Electronic device 150 may receive these types of communications even though electronic device 150 is not actively being used. In other words, electronic device 150 may receive these types of communications even when display 152 is not activated and/or protective cover 110 is in the closed position and is covering display 152.

A user may wish to know if a communication has been received without opening protective cover 110. In one example, a user may wish to know if he or she has received any new email messages without opening protective cover 110. Beneficially, window 112 of protective cover 110 is aligned with an area or portion of display 152 that is used to indicate if new messages have been received. The user can be notified of or alerted to received communications, messages, or alerts even though protective cover 110 is not opened.

In one example, a particular color may be flashed on display 152 in the area of display 152 that is aligned with window 112 to alert the user that one or more new messages have arrived. In another example, a number may be displayed in the aligned area to indicate a number of new messages (e.g., display a "3" to indicate three new messages). A separate indicator may be used for each potential type of communication (e.g., separate indicators for email messages, text messages, and voicemails) or a single indicator may be used as a combined indicator for all of the communication types. The user may be able to quickly determine if any new messages have arrived or alerts have occurred without opening protective cover 110.

Similarly, electronic device 150 may be configured for displaying other types of information that the user may wish to check or be aware of without opening protective cover 110. For example, electronic device 150 may generate a reminder for a calendar event or an alarm for a scheduled event. In other examples, electronic device 150 may indicate a status or condition such as a battery level or a power state. One or more of these reminders, alerts, alarms, statuses, and/or conditions may be displayed in an area of display 152 that is visible in window 112 when protective cover 110 is closed. They may be displayed in a manner similar to that described above with respect to the communication indicators. These reminders, alerts, alarms, statuses, and/or conditions may also be indicated by displaying a color, a number, a letter, a word, an icon, a symbol, and/or a picture in the designated area of display 152.

In some situations, any of the displayed communication indicators, reminders, statuses, and/or conditions described above may be displayed using a discrete indicator, such as an LED, that is separate from display 152. In other words, electronic device 150 may display a communication indicator, reminder, status, and/or condition through window 112 using a display element or display device that is separate from a primary display of the electronic device.

Figure 2:
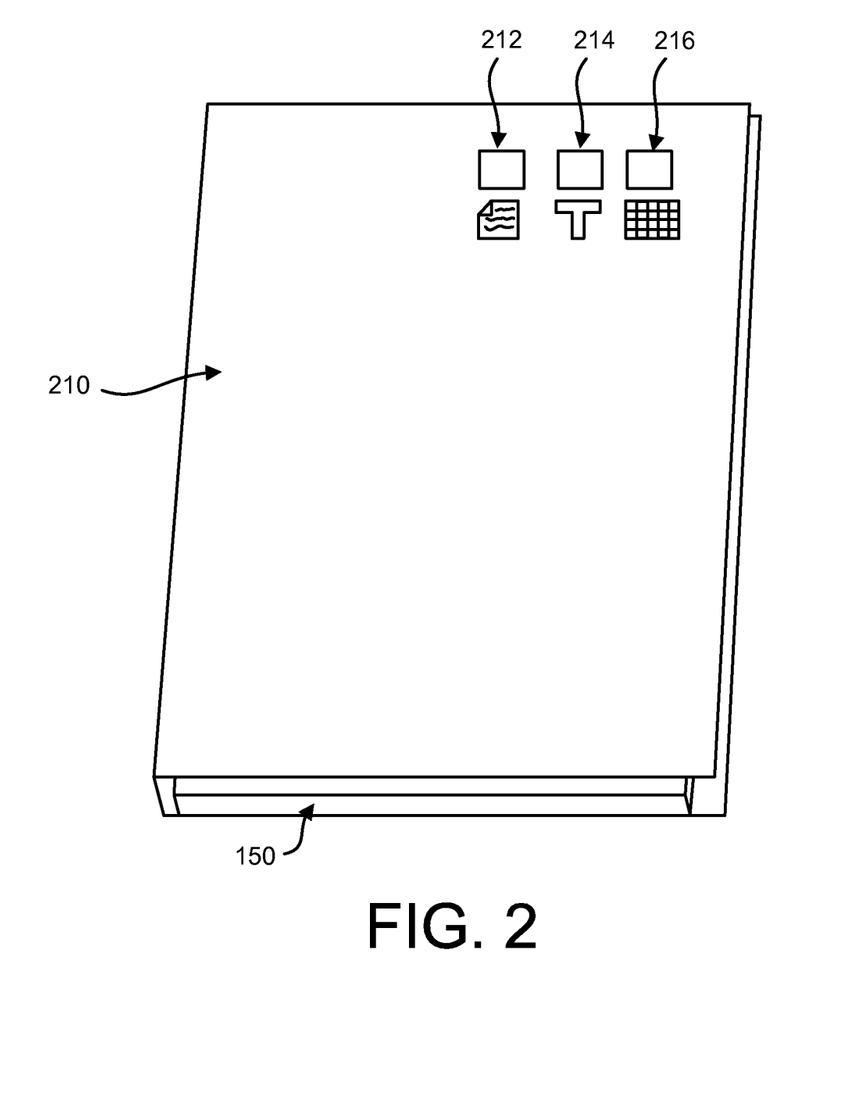
FIG. 2 illustrates an electronic device in a protective cover having multiple viewing windows.
Figure 3:
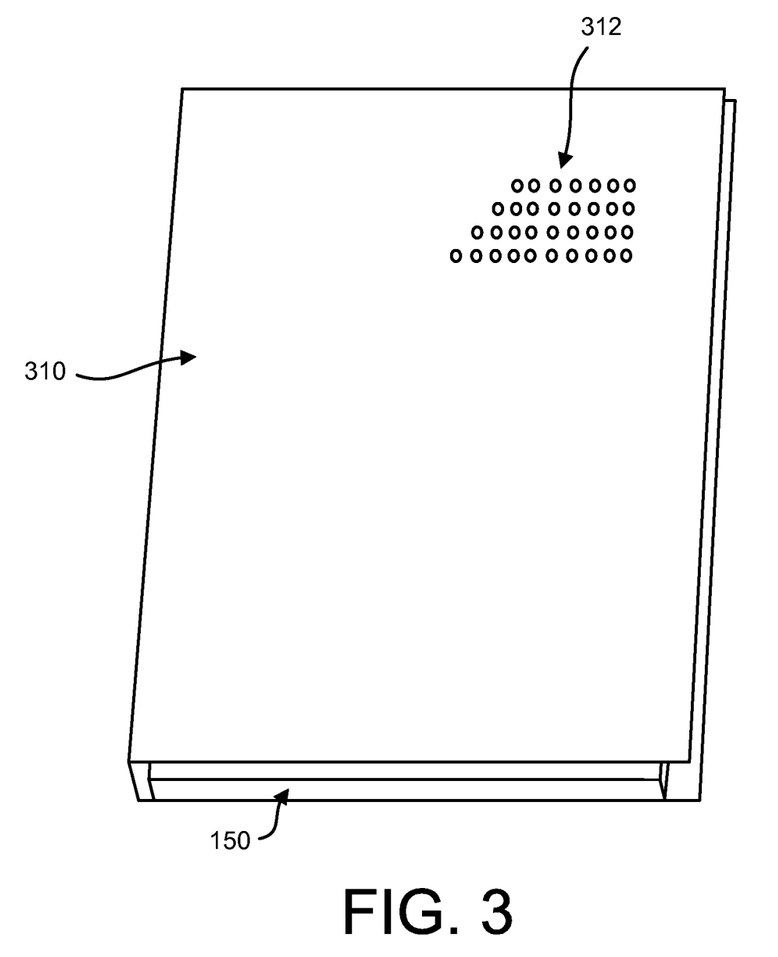
FIG. 3 illustrates an electronic device in a protective cover.

FIG. 2 illustrates electronic device 150 in protective cover 210. Protective cover 210 is an example of protective cover 110. Protective cover 210 has a plurality of viewing apertures or windows: window 212, window 214, and window 216. Each of these windows may be an example of window 212 of FIG. 1. Each of these windows may be an opening, port, or aperture that permits a user of electronic device 150 to see an alert or indicator displayed by electronic device 150 without opening protective cover 210. Protective cover 210 may include more or fewer windows than are illustrated in FIG. 3. Each of windows 212, 214, and 216 may include a transparent or semi-transparent membrane that allows the user to see the indicator through the respective window, while still providing protection to display 152 and/or electronic device 150.

In the example of FIG. 2, window 212 is associated with an indicator that indicates whether or not new email messages have been received. As illustrated in FIG. 2, protective cover 210 may contain a label, printed information, an icon, embossing, or other type of marking associated with window 212 that indicates or provides a reminder of which function of electronic device 150 is associated with window 212. When one or more new email messages arrive, electronic device 150 may display an indicator that is visible within window 212. The displayed indicator may include one or more of the following: a flashing light, a solid light, an image, a picture, an icon, a number, a letter, or a combination thereof. The indicator may be displayed until the user interacts with electronic device 150 in response to the indicator or may be displayed only for a specified period of time even if the user does not respond. Protective cover 210 may contain multiple windows, openings, ports, or apertures for email notifications, each being associated with a different email account.

Window 214 may be associated with text messages received by electronic device 150. When one or more new text messages arrive, electronic device 150 may display an indicator that is visible within window 214. The displayed indicator may include one or more of the following: a flashing light, a solid light, an image, a picture, an icon, a number, a letter, or a combination thereof. The indicator may be displayed until the user interacts with electronic device 150 in response to the indicator or may be displayed only for a specified period of time even if the user does not respond. Protective cover 210 may contain multiple windows, openings, ports, or apertures each associated with a different text message account. Indicators may also be associated with other events such as social media notifications, news updates, stock price alerts, calendar reminders, and/or other items.

Similar to windows 212 and 214, window 216 may be associated with an electronic calendar that is stored within or accessed by electronic device 150. When one or more calendar event reminders or notifications are triggered, electronic device 150 may display an indicator that is visible within window 216. The displayed indicator may include one or more of the following: a flashing light, a solid light, an image, a picture, an icon, a number, a letter, or a combination thereof. The indicator may be displayed until the user interacts with electronic device 150 in response to the indicator or may be displayed only for a specified period of time even if the user does not respond. Beneficially, the user may be reminded of an appointment on his or her calendar even though protective cover 210 is not opened. In one variation, the calendar is not stored in electronic device 150 and the calendar reminder is received or retrieved from an external source. Protective cover 210 may contain multiple windows, openings, ports, or apertures each associated with a different calendar, a different calendar program, and/or different users of electronic device 150.

Protective cover 210 may also include one or more windows, ports, openings, or apertures for displaying a status of electronic device 150 (e.g., low battery), a status of a feature of electronic device 150 (e.g., an indication wifi enabled), a status of a peripheral of electronic device 150 (e.g., an indication that a wireless keyboard is active), and/or a status of a software application running on electronic device 150 (e.g., and indication that an Internet browser is connected to the Internet).

The techniques described above with respect to FIG. 1 and/or FIG. 2 may be implemented in the form of a system that includes a protective cover, such as protective cover 110 or protective cover 210, and a software application that is executed by or runs on a computer processor of electronic device 150. A software application may be included because electronic device 150 may not be otherwise configured to display indicators in locations that are aligned with one or more of windows 212, 214, and/or 216. In other words, electronic device 150 may not have been previously programmed to specifically display alerts, notifications, or status updates in the areas corresponding to the windows of the cover. In this way, the software application can enable electronic device 150 to be more effectively used with protective cover 110 or 210 using the techniques described herein, even though electronic device 150 was not previously configured to be compatible with the windows and/or window locations of protective cover 110 or 210.

The software application may comprise computer-executable instructions that are stored in one or more memory devices of electronic device 150 and may be executed by one or more computer processors, microprocessors, and/or microcontrollers of electronic device 150. The instructions may also be stored in a memory device, such as a memory card, that is removable from electronic device 150. The software application may be downloaded from a computer server, such as from a server connected to the Internet and/or from a software application store like the APPLE APP STORE or GOOGLE PLAY. The software download process may be performed using a wired and/or wireless communication capability of electronic device 150.

In another example, a user may load the software application on electronic device 150 from a non-transitory computer-readable medium such as a memory card, a thumb drive, a compact disc, or from another external storage device that is accessed by electronic device 150 using wired and/or wireless communication methods. In yet another example, the software application may be obtained through communication with another electronic device, such as an electronic device similar to electronic device 150. In yet another example, the software application may initially be stored in a digital memory device contained within protective cover 210 and may be loaded into electronic device 150 from the digital memory of protective cover 210 using wired and/or wireless methods of communication.

The software application may operate in conjunction with or in cooperation with one or more other software programs or applications running on electronic device 150. These other programs may be configured to display a notification of an event (e.g., an indication that a new email message has been received) and the software application may obtain or share this notification information to display it in a location that is compatible with the locations of windows 212, 214, and/or 216 in protective cover 210. The software application may also include user configurable features such as, for example: what type of event each of the one or more windows will be associated with, how a notification will be displayed in the window, how long a notification will be displayed in the window, whether or not an audio or haptic notification will accompany the notification, where on the display status information will be displayed, and/or whether multiple types of events are associated with a single notification window. Many other user configurable features or options are possible. For example, one or more of the indicators may be configured to only provide notifications during certain days and/or time periods (e.g., notifications associated with a work email account may not provided at night after 7:00 PM and/or on weekends).

In some configurations, protective cover 110 or protective cover 210 may include a feature for use in determining whether the cover is opened or closed. This may be useful in determining how the electronic device is being viewed or used for purposes of determining whether or not the status information should be displayed as described herein. In one example, the front of protective cover 110 or 210 includes a magnet detectable by electronic device 150. When the front cover is closed, electronic device 150 detects the proximity of the magnet and displays status information in an area viewable through window 112 as described herein. When the magnet is not detected, the cover is open and electronic device 150 displays information as it would under normal circumstances because the cover is open and the user is using the device in a typical manner. In another example, the front of protective cover 110 or 210 includes a piece of metallic material that is detectable by electronic device 150 to determine when the front of the cover is opened or closed.

In yet another example, the view from a front facing camera of electronic device 150 is used to determine when the front cover is opened or closed. Capturing of a dark or black image may be an indication that the cover is closed over the camera. Alternately, the inside of the cover in the proximity of the camera may include an identifiable color, design, or pattern that will be visible in an image captured by the camera in order to determine when the cover is closed. Because lighting may be low for the camera when the cover is closed, the protective cover may also be optically transparent, partially transparent, or opaque in an area of the camera in order to permit enough light for the camera to capture the identifiable color, design, or pattern. The inside of the front cover may also contain a reflective surface that would reflect a flash directly back into the camera for determining when the front cover is closed. Other methods of determining whether the front cover is open or closed are possible and the various techniques disclosed herein are not to be limited to any particular method of determining whether the cover is open or closed.

FIG. 3 illustrates electronic device 150 in protective cover 310. Protective cover 310 includes a plurality of ports 312. The ports 312 are holes or apertures through the front of protective cover 310 and may be smaller than windows 112, 212, 214, and/or 216 in the examples of FIG. 1 and FIG. 2. Ports 312 may include a smaller or a larger number of ports than is illustrated in FIG. 3. Ports 312 are sized such that they may not be large enough to see a number, a letter, an icon, or a picture to a user of electronic device, but may be large enough to transmit light generated by a display of electronic device 150. Many electronic devices are configured to display an alert, a dialog box, or other indicator when an event occurs. Often, this involves activating the display and an associated backlight. In these situations, a user of electronic device is able to see some of the light generated by the display of electronic device 150 through ports 312 when one of these events occurs. Beneficially, the user is made aware of the notification even though the user has protective cover 310 closed and/or may not be actively using electronic device 150.

Ports 312 may optionally include transparent, semi-transparent, or opaque membranes. The membrane permits light generated by the display to be visible through the port while still providing protection for electronic device 150 and/or display 152. Ports 312 may be sized to have areas in a range of 0.08 to 0.12 square inches. Ports 312 may also be sized to have areas in a range of 0.05 to 0.08 square inches. Ports 312 may also be sized to have areas in a range of 0.03 to 0.05 square inches. Ports 312 may also be sized to have areas in a range of 0.005 to 0.03 square inches. In addition, protective cover 310 may include more than one grouping of ports, such as ports 312, in various locations on protective cover 310. Ports 312 may be of any shape or of any combination of shapes. In addition, protective cover 310 may include multiple groups of ports, such as ports 312. The ports may also be arranged or grouped in an artistic manner, in an aesthetically pleasing manner, and/or in a manner to convey additional information. In one example, the ports may be arranged such that they denote the initials of an owner of the device.

Figure 4:
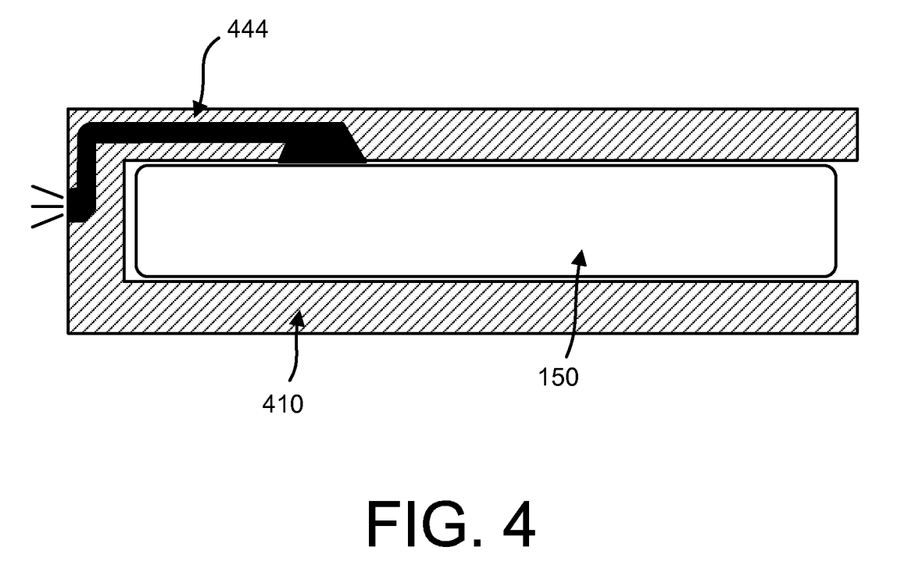
FIG. 4 illustrates a protective cover having a light pipe.

FIG. 4 illustrates a cross section of a protective cover 410 on electronic device 150. Protective cover 410 includes a light pipe 444 for routing or optically conducting an optical notification from one location to another. Molded plastic light pipes or tubes are sometimes used in electronic devices to direct light from a light emitting device to another location. A light pipe may be configured to direct, route, or conduct light emitted from one surface of an electronic device to a surface of a protective cover that is in another plane. In some cases, light pipe 444 may be an optical waveguide.

In the example of FIG. 4, light pipe 444 is configured to capture light from a top surface of electronic device (e.g., from a backlit touchscreen display of electronic device 150 or from an LED indicator on a front surface of electronic device 150) when protective cover 410 is in a closed position. The light is transmitted or reflected to the spine edge or surface of protective cover 444 such that lighting on the front or on the display surface of electronic device 150 can be seen from a different direction. Beneficially, when the display or indicator of electronic device 150 lights, this can be observed by a user that is looking at the spine edge or surface of protective cover 410. This may be useful if electronic device 150 is lying on a shelf or is within a stack of other items. Light pipe 444 enables the optical information to be displayed on another surface of protective cover 410 without protective cover 410 necessarily comprising a battery or any powered components.

Light pipe 444 may have a complex shape that uses either gentle curving bends to route light as in an optical fiber or may have sharp prismatic folds which reflect off the angled corners. Light pipe 444 may simultaneously direct light to multiple locations on protective cover 410 and/or separate light pipes may configured to direct light to multiple locations on protective cover 410. For example, light pipe 444 may direct light as illustrated in FIG. 4 in addition to directing light to a top surface of protective cover 410. Protective cover 410 may include multiple light pipes similar to light pipe 444 for conveying multiple indicators as discussed with respect to FIG. 2. The individual light pipes may be individual components or may be constructed using a single piece of plastic or other material.

Light pipe 444 may be routed within the outer surfaces of protective cover 410 as illustrated in FIG. 4 or may be routed along one or more of the surfaces of protective cover 410. Light pipe 444 may be configured to provide a visual indication on more than one surface of protective cover 410. In some cases, one or more light pipes may be routed along an outer surface of protective cover 410 such that light is emitted along the portions of the length of the light pipe(s) in order to provide an aesthetically pleasing or artistic visual design or effect. Protective cover 410 may be configured to not flex or bend in portions containing light pipe 444. Alternately, light pipe 444 may be configured to accommodate the bending or flexing of protective cover 410 by, for example, using a flexible material for light pipe 444. In some situations, light pipe 444 may comprise one or more optical fibers and/or one or more fiber optic strands.

In some configurations, a light pipe, such as light pipe 444, may be used in conjunction with one or more windows, such as window 112, 212, 214, and/or 216, for conducting light to another surface of a protective cover, in addition to having a visual indicator visible through the window. In this way, a visual indication may simultaneously be visible through the front of the protective cover as well as on another surface of the protective cover.

In another embodiment, the techniques introduced here may be performed in the form of a method. The method may include determining that a display of an electronic device is in an inactive state. The method may also include determining whether a front of a protective cover is in an open or a closed position. The method may further include displaying a notification of an event on a portion of the display where the portion of the display is aligned with one or more apertures, viewing windows, or viewing ports of a protective cover attached to the electronic device.

The methods, apparatuses, systems, and components described above are meant to exemplify some types of possibilities. In no way should the aforementioned examples limit the scope of the invention, as they are only exemplary embodiments.

The foregoing disclosure has been presented for purposes of illustration and description. Other modifications and variations may be possible in view of the above teachings. The examples described in the foregoing disclosure were chosen to explain the principles of the concept and its practical application to enable others skilled in the art to best utilize the invention. It is intended that the claims be construed to include other alternative embodiments of the invention, except as limited by the prior art.

The phrases "in some embodiments," "according to some embodiments," "in the embodiments shown," "in other embodiments," "in one example," "in another example," "in some cases," "in some situations," "in one configuration," "in another configuration," and the like generally mean that the particular feature, structure, or characteristic following the phrase is included in at least one embodiment of the present invention and/or may be included in more than one embodiment of the present invention. In addition, such phrases do not necessarily refer to the same embodiments or to different embodiments.

What is claimed is:

1. A system for use with a mobile electronic device, the system comprising:
    a protective cover for the mobile electronic device, the protective cover including:
        a securing element for affixing the protective cover to the mobile electronic device; and
        a cover element attached to the securing element, the cover element configured to protect one or more surfaces of the mobile electronic device, the cover element having at least an open position and a closed position with respect to the mobile electronic device, the open position providing access to a display of the mobile electronic device, the closed position providing protection for the display, the cover element including an aperture through which a portion of the display is viewable when the cover element is in the closed position; and
    a set of non-transitory computer-executable instructions downloadable to the mobile electronic device from a computer server over a network, the instructions executable by at least one computer processor of the mobile electronic device to:
        receive an input from an end user of the mobile electronic device, the input indicating a selection of status information to be displayed in the portion of the display viewable when the cover element is in the closed position, the selection of the status information reconfigurable by the end user;
        direct the mobile electronic device to display the status information in the portion of the display viewable through the aperture when the cover element is in the closed position; and
        direct the mobile electronic device to alternate between display of the status information and second status information in the portion of the display in response to receiving another input from the user.

2. The system of claim 1 wherein the status information includes one or more of: an indication that one or more new email messages have been received by the mobile electronic device, an indication that one or more new text messages have been received by the mobile electronic device, an indication that one or more new voicemail messages have been received by the mobile electronic device, an indication that one or more telephone calls have been missed, and an indication of a calendar event.

3. The system of claim 1 wherein a transparent membrane or a semi-transparent membrane spans the aperture.

4. The system of claim 1 wherein the protective cover provides protection to a back of the mobile electronic device when the cover element is in the closed position and when the cover element is in the open position.

5. The system of claim 1 wherein the mobile electronic device is one or more of: a mobile telephone, a smartphone, a cellular phone, a tablet computing device, a camera, and an electronic book reader.

6. The system of claim 1, the cover including a second aperture, a second portion of the display viewable through the second aperture.

7. The system of claim 6 wherein the instructions further direct the mobile electronic device to display second status information in the second portion of the display.

8. The system of claim 7 wherein the instructions are further configured to, in response to a second input from the end user of the mobile electronic device, display the second status information in the portion of the display and display the status information in the second portion of the display.

9. The system of claim 1 wherein the instructions further direct the mobile electronic device to display the status information in the portion of the display when the display is not otherwise in use.

10. The system of claim 1 wherein the instructions further direct the mobile electronic device to determine whether the cover element is in the closed position and displaying the status information is conditioned upon determining that the cover element is in the closed position.

11. The system of claim 10 wherein the cover element includes a magnet detectable by the mobile electronic device for determining when the cover element is in the closed position.

12. The system of claim 10 wherein determining whether the cover element is in the closed position includes capturing an image from a camera of the mobile electronic device to determine if the cover element is near the camera.

13. The system of claim 1 wherein the instructions further direct the mobile electronic device to generate an audible signal or generate a haptic notification in conjunction with the display of the status information.

14. The system of claim 1 wherein the status information includes an indication of a total number of unread email messages in an email account accessed by the mobile electronic device.

15. A system comprising:
    a protective case for use with a mobile computing device having a display, the protective case semi-permanently attachable to the mobile computing device, the protective case configured to protect the mobile computing device and having at least an open position and a closed position with respect to the display of the mobile computing device, the open position providing access to the display, the closed position providing protection for the display, the protective case including a plurality of viewing ports through which an area of the display is visible when the protective case is in the closed position; and
    a set of non-transitory computer instructions, the instructions executable by at least one computer processor of the mobile computing device to receive an input from a user of the mobile computing device indicating a selection of status information from among a plurality of status information to be displayed in the area of the display, direct the mobile computing device to display the selected status information in the area of the display in response to the input and in response to an event detected by the mobile computing device, and direct the mobile computing device to alternate between display of the selected status information and second status information in the area of the display in response to receiving a second input from the user.

16. The system of claim 15 wherein the event includes one or more of: receiving a new email message, receiving a new text message, receiving a voicemail message, detecting a missed telephone call, indicating a social media update, indicating a news update, and generating a notification regarding a calendar event.

17. The system of claim 15, each of the plurality of viewing ports having an area in a range of 0.08 to 0.12 square inches.

18. The system of claim 15, each of the plurality of viewing ports having an area in a range of 0.05 to 0.08 square inches.

19. The system of claim 15, each of the plurality of viewing ports having an area in a range of 0.03 to 0.05 square inches.

* * * * *